(12) United States Patent
Morag et al.

(10) Patent No.: US 10,203,183 B2
(45) Date of Patent: Feb. 12, 2019

(54) MULTISPECTRAL CAMOUFLAGE MATERIAL

(75) Inventors: Elad Morag, Ein Hahoresh (IL); Uria Kaplan, Ein Hahoresh (IL)

(73) Assignee: Ametrine Technologies Ltd., Ein Hahoresh (IL)

( * ) Notice: Subject to any disclaimer, the term of this patent is extended or adjusted under 35 U.S.C. 154(b) by 453 days.

(21) Appl. No.: 14/350,084

(22) PCT Filed: Apr. 29, 2012

(86) PCT No.: PCT/IB2012/052142
§ 371 (c)(1),
(2), (4) Date: Apr. 7, 2014

(87) PCT Pub. No.: WO2013/054207
PCT Pub. Date: Apr. 18, 2013

(65) Prior Publication Data
US 2014/0304883 A1 Oct. 16, 2014

(30) Foreign Application Priority Data
Oct. 11, 2011 (IL) .......................................... 215717

(51) Int. Cl.
*F41H 3/02* (2006.01)
*B32B 3/26* (2006.01)
(Continued)

(52) U.S. Cl.
CPC ............... *F41H 3/02* (2013.01); *B32B 3/266* (2013.01); *B32B 5/26* (2013.01); *B32B 38/0004* (2013.01);
(Continued)

(58) Field of Classification Search
CPC ......... B32B 27/322; B32B 3/266; B32B 5/32; F41H 3/02; H01Q 17/005
See application file for complete search history.

(56) References Cited

U.S. PATENT DOCUMENTS 2,911,652 A * 11/1959 Ekman ................... A42B 3/003
2/175.6
3,315,259 A  4/1967 Wesch
(Continued)

FOREIGN PATENT DOCUMENTS

EP       0490467 A2    6/1992
EP       1703247 A1    9/2006
(Continued)

OTHER PUBLICATIONS

International Application # PCT/IB2012/052142 Search Report dated Apr. 29, 2013.
(Continued)

*Primary Examiner* — Anna K Kinsaul
(74) *Attorney, Agent, or Firm* — Banner & Witcoff, Ltd.

(57) ABSTRACT

A fabric (30) includes a first flexible fabric layer (32), having fabric emissivity properties in a visible radiation range that are selected so as to mimic ambient emissivity properties of a deployment environment of the fabric, and at least one second flexible fabric layer (34), which is joined to the first flexible fabric layer, and which is configured to scatter long-wave radiation that is incident on the fabric. The first and second flexible fabric layers are perforated by a non-uniform pattern of perforations (44) extending over at least a part of the fabric.

22 Claims, 4 Drawing Sheets

(51) Int. Cl.
*B32B 5/26* (2006.01)
*B32B 38/00* (2006.01)
*B32B 38/04* (2006.01)

(52) U.S. Cl.
CPC ........ *B32B 38/04* (2013.01); *B32B 2038/047* (2013.01); *Y10T 156/1057* (2015.01); *Y10T 428/24298* (2015.01); *Y10T 428/24331* (2015.01)

(56) References Cited

U.S. PATENT DOCUMENTS

| | | | |
|---|---|---|---|
| 3,733,606 A * | 5/1973 | Johansson | F41H 3/02 |
| | | | 342/3 |
| 4,287,243 A | 9/1981 | Nelson | |
| 4,479,994 A * | 10/1984 | Berg | B32B 27/12 |
| | | | 428/195.1 |
| 4,493,863 A * | 1/1985 | Karlsson | F41H 3/02 |
| | | | 156/268 |
| 4,529,633 A | 7/1985 | Karlsson | |
| 5,348,789 A | 9/1994 | Hellwig | |
| 6,047,404 A | 4/2000 | Blanks | |
| 7,148,161 B2 | 12/2006 | Hellwig et al. | |
| 7,244,684 B2 | 7/2007 | Hexels | |
| 8,013,776 B2 | 9/2011 | Child | |
| 2001/0001753 A1 | 5/2001 | Nelson et al. | |
| 2009/0081453 A1 | 3/2009 | Edman et al. | |
| 2009/0263644 A1 * | 10/2009 | Kelsey | F41H 3/00 |
| | | | 428/315.9 |
| 2010/0112316 A1 | 5/2010 | Cincotti et al. | |
| 2010/0288116 A1 | 11/2010 | Cincotti et al. | |

FOREIGN PATENT DOCUMENTS

| | | |
|---|---|---|
| GB | 2101876 A | 1/1983 |
| IL | 202410 A | 11/2010 |
| IL | 167330 A | 1/2011 |
| WO | 2010134080 A1 | 11/2010 |

OTHER PUBLICATIONS

European Application # 12840209.6 Search Report dated Apr. 14, 2015.
Mallinckrodt Baker, Inc., "Aluminum Powder—MSDS No. A2712", 11 pages, Dec. 8, 1996.
New World Textile Testing Laboratory, "Product: 70 Denier—Nylon Multicam DWR Finished (Non-Coated)", 2 pages, Oct. 22, 2010.
3M™, "3M™ Screen Printable UV-Curing Adhesive 7555", 4 pages, 2008.
Yail Noa Group, "Fabric: Epsilon Multicam", Technical Data Sheet, 1 page, Aug. 28, 2011.
Diatex, M3526 PA/CO, Fiche technique Technical data sheet/Specification, 1 page, Oct. 2006.
Soliani EMC SRL, "Electrically Conductive Fabric Ponge", Technical data sheet, Rev. 2, 1 page, Jun. 18, 2009.
Shing Fu Fiber Dyeing & Finishing Co., Ltd., "Featured Products", 2 pages, year 2009.
Freudenberg, "Vilene Products—Nonwoven Classic Interlinings", 1 page, year 2015.
Mar. 2, 2018 (AU) Australian Examination Report—App 2017203449.

\* cited by examiner

MULTISPECTRAL CAMOUFLAGE MATERIAL

FIELD OF THE INVENTION

The present invention relates generally to multi-layer fabrics, and particularly to layered fabrics having multispectral camouflage capabilities.

BACKGROUND

Traditionally, camouflage fabrics have been colored and textured so as to make it difficult to visually distinguish the fabric from its surroundings. With the increasing importance of thermal and radar imaging in the battlefield, some camouflage fabrics are now designed to suppress infrared and/or microwave radiation, as well.

For example, U.S. Patent Application Publication 2010/0112316, whose disclosure is incorporated herein by reference, describes a visual camouflage system that includes a vinyl layer having a camouflage pattern on its front surface with a site-specific camouflage pattern. A laminate layer is secured over the front surface of the vinyl layer, coating the camouflage pattern to provide protection to the camouflage pattern and strengthen the vinyl layer. One or more nanomaterials are disposed on the vinyl layer, the camouflage pattern, or the laminate to provide thermal and/or radar suppression.

As another example, U.S. Pat. No. 7,148,161, whose disclosure is incorporated herein by reference, describes a thermal camouflage tarpaulin for hiding heat sources against detection in a thermal image. The tarpaulin comprises a base textile composed of a knitted or woven glass fabric on the side that is remote from the heat source with a compound whose reflectance values are in the region of a visual camouflage and/or in the infrared region. The base textile is provided with a free-standing polyester film to which a vapor-deposited coating that reflects thermal radiation has been applied on the side facing the heat source.

As a further example, U.S. Pat. No. 7,244,684, whose disclosure is incorporated herein by reference, describes a thermal camouflage sheet for covering heat sources against identification in a thermal image. The sheet has a base textile with a glass filament, with a coating that contains aluminum powder on one side and a coating that contains color pigments on the other side. The remission values of the color pigments are in a range that allows camouflaging in the visual-optical and near infrared.

SUMMARY

Embodiments of the present invention that are described hereinbelow provide multispectral, multi-purpose camouflage materials that can be used in a wide range of different ambient conditions.

There is therefore provided, in accordance with an embodiment of the present invention, a fabric, including a first flexible fabric layer, having fabric emissivity properties in a visible radiation range that are selected so as to mimic ambient emissivity properties of a deployment environment of the fabric. At least one second flexible fabric layer is joined to the first flexible fabric layer, and is configured to scatter long-wave radiation that is incident on the fabric. The first and second flexible fabric layers are perforated by a non-uniform pattern of perforations extending over at least a part of the fabric.

Typically, the long-wave radiation scattered by the at least one second flexible fabric layer includes infrared thermal radiation and/or microwave radiation.

The perforations may have multiple different sizes and shapes, such as triangular or quadrilateral forms.

In disclosed embodiments, the at least one second flexible fabric layer includes microballoons, a metallic film, and/or a conductive net.

There is also provided, in accordance with an embodiment of the present invention, a camouflage garment, including a fabric as described above, wherein the fabric is cut and sewn so as to be worn over the body of an ambulatory human subject.

The fabric may be cut and sewn so as to provide a first configuration that camouflages the subject in a first deployment environment and, when the garment is turned inside-out, a second configuration that camouflages the subject in a second deployment environment.

There is additionally provided, in accordance with an embodiment of the present invention, a method for producing a fabric, which includes providing a first flexible fabric layer, having fabric emissivity properties in a visible radiation range that are selected so as to mimic ambient emissivity properties of a deployment environment of the fabric. At least one second flexible fabric layer, which is configured to scatter long-wave radiation that is incident on the fabric, is joined to the first flexible fabric layer. The first and second flexible fabric layers are perforated with a non-uniform pattern of perforations extending over at least a part of the fabric.

There is further provided, in accordance with an embodiment of the present invention, a camouflage garment, including a fabric that is cut and sewn so as to be worn over the body of an ambulatory human subject, wherein the fabric has a first configuration that camouflages the subject in a first deployment environment and, when the garment is turned inside-out, a second configuration that camouflages the subject in a second deployment environment, different from the first deployment environment.

In one embodiment, the first deployment environment is a daytime environment, and the second deployment environment is a nighttime environment. Additionally or alternatively, the first deployment environment is a vegetated environment, and the second deployment environment is a desert environment.

In a disclosed embodiment, the garment includes quick-connect fasteners between a torso and extremity sleeves of the garment, wherein the fasteners are configured to permit the extremity sleeves to be fastened to the torso while one or more of the extremity sleeves are turned inside-out relative to the torso.

The present invention will be more fully understood from the following detailed description of the embodiments thereof, taken together with the drawings in which:

DETAILED DESCRIPTION OF EMBODIMENTS

Camouflage fabrics are commonly used in producing military uniforms that reduce the daytime visibility of the wearer, but wearable camouflage against detection by long-wave sensors (thermal infrared or microwave radar) has yet to be widely deployed. Thermal and radar camouflage materials that are known in the art tend to be too heavy for use by ambulatory foot soldiers and do not allow sufficient ventilation or heat exchange to maintain a reasonable level of comfort. They are thus not practical for operational use.

Embodiments of the present invention that are described hereinbelow address these problems by providing a multi-layer fabric that is sufficiently light and ventilated to be used in camouflage suits for ambulatory human subjects. The fabric is also suitable, however, for covering animals, vehicles, boats, aircraft and stationary objects. The fabric comprises one fabric layer having emissivity properties in the visible radiation range that are selected so as to mimic ambient emissivity properties of the deployment environment of the fabric, thus providing visual camouflage. One or more additional flexible fabric layers, joined to the visual camouflage layer, are configured to scatter long-wave radiation that is incident on the fabric and thus provide infrared and/or microwave camouflage.

The fabric layers are perforated by a non-uniform pattern of perforations extending over part or all of the fabric. These perforations typically have multiple different sizes and shapes, such as different triangular or quadrilateral forms. The inventors have found that such non-uniform perforations serve multiple purposes: They both provide ventilation to the inside of the fabric and reduce its weight, and they also blur the long-wave radiation returned by the fabric to thermal and radar imaging devices. These features are valuable in substantially all camouflage applications, but they are particularly useful when the fabric is cut and sewn to be worn over the human body as a camouflage garment, such as a full-body camouflage suit.

Figure 1A:
FIGS. 1A and 1B are schematic frontal views of a multispectral camouflage suit, in accordance with an embodiment of the present invention.
Figure 1B:

FIGS. 1A and 1B are schematic frontal views of a multispectral camouflage suit 20 worn by a human subject, in accordance with an embodiment of the present invention. The suit comprises a reversible multi-layer laminate, as described below in greater detail. The suit may include coverings for the subject's hands and face, as well (not shown in the figure). Although the figures show a particular sort of full-body camouflage suit, the fabrics described herein may similarly be used in producing camouflage garments of other sorts.

FIG. 1A shows a first configuration of suit 20, suitable particularly for daytime deployment environments, in which a first outer fabric layer 22 has emissivity properties that mimic the daytime visual environment in which the suit is to be used. FIG. 1B shows the second configuration, suitable particularly for nighttime deployment environments, which is obtained by turning suit 20 inside-out. In this latter configuration, the inner layer in the configuration of FIG. 1A becomes a second outer fabric layer 24, which is chosen for its low emissivity and infrared-reflecting properties (spectral and/or diffuse). By reflecting infrared radiation from the environment, layer 24 appears to be at approximately the same temperature as its environment and therefore resists detection by thermal imaging devices. The ability of suit 20 to provide both visual and thermal camouflage and to operate under both day and night conditions reduces the cost of outfitting each soldier (or other subject) and reduces the volume and weight of equipment that the soldier must carry.

Alternatively or additionally, the two outer fabric layers may be configured to camouflage the wearer in different physical deployment environments. For example, one side may be designed to provide camouflage in a vegetated environment (such as a forest), while the other side provides camouflage in desert environments, in which vegetation is sparse or absent entirely.

Figure 2:
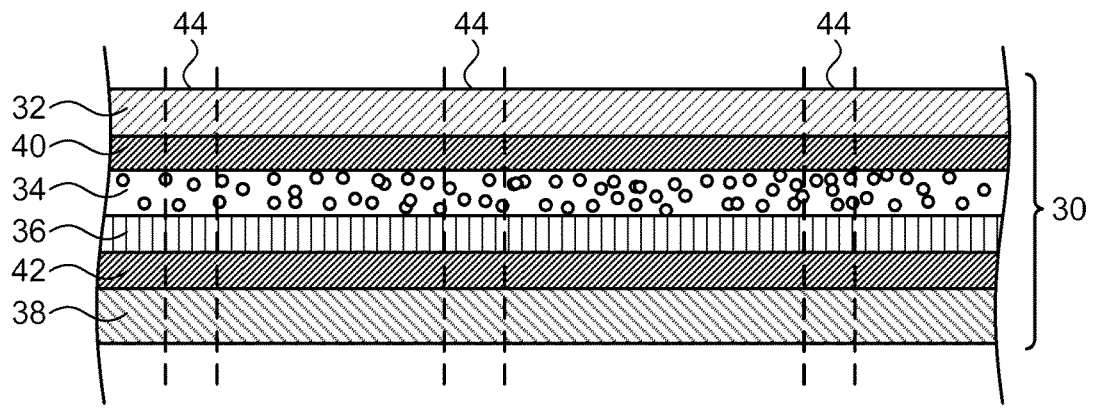
FIG. 2 is a schematic, sectional view of a multispectral camouflage fabric, in accordance with an embodiment of the present invention.

FIG. 2 is a schematic, sectional view of a laminated fabric 30 that may be used in producing suit 20, as well as other camouflage items, in accordance with an embodiment of the present invention. This figure shows one particular set of layers by way of example and not limitation. Some alternative structures are described below. The disclosed embodiments are capable of providing effective, multispectral camouflage under a range of conditions, including both night and day and climatic extremes, such as desert heat and arctic cold. The fabric is passive and operates without electrical power input.

For visual, daytime camouflage, fabric 30 comprises an outer layer 32 of ripstop cotton, with a suitable pattern (such as that shown in FIG. 1A) printed using low-emissivity pigments. Optionally, the pigments may be applied in the field, to match ambient colors and conditions.

An underlying layer 34 containing glass microballoons is laminated to layer 32 using a spun web 40 of polyurethane fibers. The microballoons, whose sizes are in the range of 50-500 µm, scatter radiation, particularly infrared radiation, and thereby blurs the thermal signature of the wearer. Alternatively or additionally, some or all of the microballoons may be coated with metal to improve their microwave-scattering properties and thereby blur the radar signature of the wearer. Although microballoons are typically round, some or all of the microballoons in layer 34 may be prismatic in shape. In alternative embodiments, microballoons may be located between other layers of the fabric or may be coated over the outer fabric surface.

A reflective layer 36 may be fixed to the underside of layer 34, to provide specular scattering of infrared and/or microwave radiation. Layer 36 may comprise, for example, a polyester weave coated with a metallic film, such as titanium and/or aluminum or aluminum mixed with titanium oxide, gold, nickel and their alloys and/or oxides. The weave may alternatively be made using fibers containing suitable metals, in which case an additional layer of reflective lamination is not needed. The polyester may conveniently be a ripstop, water-repellant material.

For nighttime camouflage, an alternative outer layer 38 may be printed with a suitable pattern (also in low-emissivity pigment) and laminated to layer 36 by another polyurethane spun web 42. Layer 38, may comprise, for example, a 40-denier ripstop nylon, which is water-repellant and air-permeable, produced and coated using a suitable nano-process, which gives superior results to conventional water-repellant treatments using larger particles.

Multiple perforations 44 are cut through the layers of fabric 30. Typically, the perforations are in the range of 2-3 mm wide and are spaced 7-25 mm apart. The perforations may be of different shapes and sizes, as illustrated, for example, in FIGS. 3 and 4. The sizes and spacings of the perforations are chosen to give, inter alia, sufficient ventilation while maintaining durability and strength of the fabric.

The overall thickness of fabric 30, based on the above sequence of layers, is approximately 0.20-0.40 mm and the weight is roughly 150-250 grams/m². A suit made from this fabric, of the sort shown in FIGS. 1A and 1B, for example, would thus weigh about 800-1250 grams.

A variety of other layer structures can be used in alternative embodiments of the present invention. Table 1 below lists typical materials that can be used in these structures, while Tables A-J show examples of layer structures that can be composed from these materials.

TABLE 1

LAYER MATERIALS

| Label | Description | Thickness (typical) |
|---|---|---|
| COTTON | Printed cotton (see layer 32 above). For example, M3526 PA/CO fabric, produced by DIATEX (St-Genis-Laval, France). | 0.20 mm |
| MBG | Glass microballoons (see layer 34 above). For example, 3M ™ Glass Bubbles, K Series or S Series, produced by 3M Energy and Advanced Materials Division (St. Paul, Minnesota). | 0.06 mm |
| METP | Metal Powder, such as powders 516H, 510HV, 5900FHV, or 5906PAF produced by PAC (Loveland, Ohio); or aluminum metallic powder CI 77000, produced by Mallinckrodt Baker, Inc. (Phillipsburg, New Jersey). | 10-20 µm |
| MBG - COATED | Glass microballoons with metal coating, such as the 3M materials mentioned above. | 0.06 mm |
| SWPU | Spun web - polyurethane (see layers 40 and 42 above). For example, VILENE, produced by Freudenberg Anlagen- und Werkzeugtechnik KG (Neuenburg, Germany). | 0.06 mm |
| COMPMET | Metal-coated polyester weave (see layer 36 above). Such materials are available, for example, from Shing Fu Textile Technology Co. (Cingshuei Township, Taiwan). | 0.05 mm |
| NANO | Nano-treated nylon (see layer 38 above), such as kk-k00mceps40drsn fabric, produced by K&K Advance Textile Solutions (Holon, Israel). | 0.06 mm |
| MNET | Conductive metal net with electro-magnetic shielding properties, such as PONGE, produced by Soliani EMC (Como, Italy). | 0.09 mm |
| UVCPA | UV-curing printable adhesive, such as 3M ™ Screen Printable UV-Curing Adhesive 7555, produced by 3M (St. Paul, Minnesota). | 2-5 µm |
| DES-SA | Desert sand | |
| NANO-MET | Nano-treated nylon with metal coating, such as the K&K Advance Textile Solutions materials mentioned above. | 0.06 mm |

TABLE A

STRUCTURE SHOWN IN FIG. 2
(This sort of fabric is useful particularly in reversible camouflage suits for forest and desert environments.)

COTTON
SWPU
MBG
COMPMET
SWPU
NANO

TABLE B (Useful particularly as a reversible covering for stationary objects in forested and desert environments.)

MBG
METP
UVCPA
COTTON
SWPU
NANO

TABLE C (Useful particularly as a reversible covering for armored vehicles, when stationary or mobile, in forested and desert environments.)

DES-SA
UVCPA
NANO
SWPU
COMPMET

TABLE C-continued (Useful particularly as a reversible covering for armored vehicles, when stationary or mobile, in forested and desert environments.)

SWPU
COTTON

TABLE D (Useful particularly for as a reversible camouflage cover for infantry posts and as personal camouflage netting in forested and desert environments.)

COTTON
MBG
METP
UVCPA
NANO

TABLE E (Useful particularly for as a reversible camouflage cover for infantry posts and as personal camouflage netting in forested and desert environments.)

COTTON
MBG - COATED
UVCPA
NANO

TABLE F (Useful particularly in reversible camouflage suits for forest and desert environments.)

COTTON
SWPU
COMPNET
SWPU
NANO

TABLE G (Useful particularly as a reversible covering for mobile armored vehicles in forested and desert environments.)

COTTON
SWPU
COMPNET

TABLE H (Useful particularly as camouflage in areas of extreme temperatures, including both snowy and very hot environments.)

NANO-MET
SWPU
COTTON

TABLE I (Useful for multi-spectral camouflage - including radar blocking - particularly for boats, aircraft, and strategic land vehicles, such as missile carriers and mobile command/control systems.)

COTTON
SWPU
MNET
SWPU
NANO

TABLE J (Useful for camouflage of strategic objects.)

MBG
UVCPA
COTTON
SWPU
MNET
NANO

The above embodiments are shown here only by way of example, and alternative layer structures, which will be apparent to those skilled in the art upon reading this specification, are also considered to be within the scope of the present invention.

Figure 3:
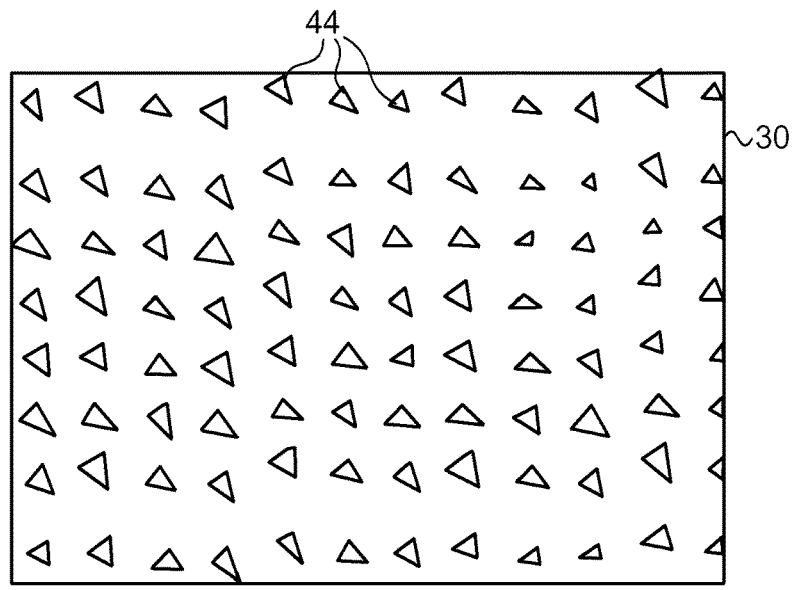
FIGS. 3 and 4 are schematic frontal views of perforated camouflage fabrics, in accordance with embodiments of the present invention.
Figure 4:
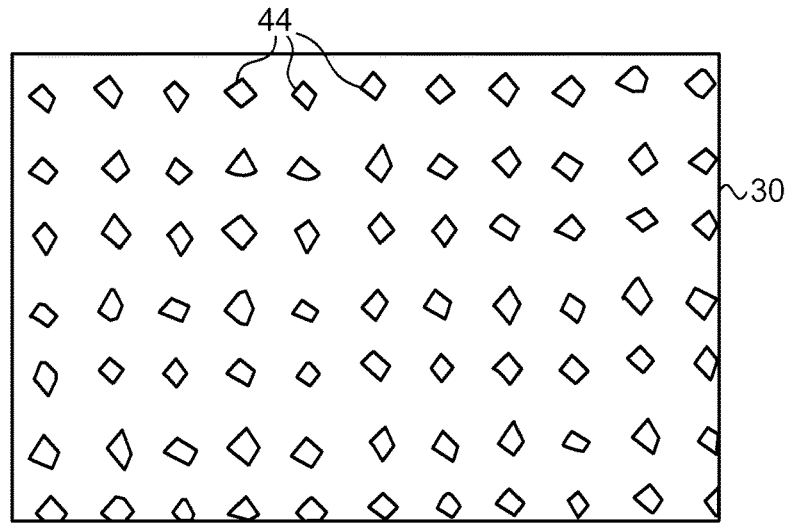

FIGS. 3 and 4 are schematic frontal views of camouflage fabrics 30 having different sorts of perforations 44, in accordance with embodiments of the present invention. In the embodiment of FIG. 3, perforations 44 are triangular and are non-uniform in terms of both their sizes and orientations. In FIG. 4, the perforations are generally quadrilateral and vary in size and overall shape. Although the perforations in FIGS. 3 and 4 are roughly evenly spaced, the spacings between the perforations may, additionally or alternatively, be non-uniform, as well.

As noted earlier, perforations 44 are useful in providing ventilation, to prevent overheating inside suit 20, and the non-uniformity of the perforations helps to blur the thermal and/or radar signature of the wearer. For good ventilation in warm weather conditions, the perforations may be supplemented by vents in the sewn fabric. Typically, an air flow rate of 1-3 cubic feet per minute (CFM) at a pressure of 20-30 pascal is desirable.

Figure 5:
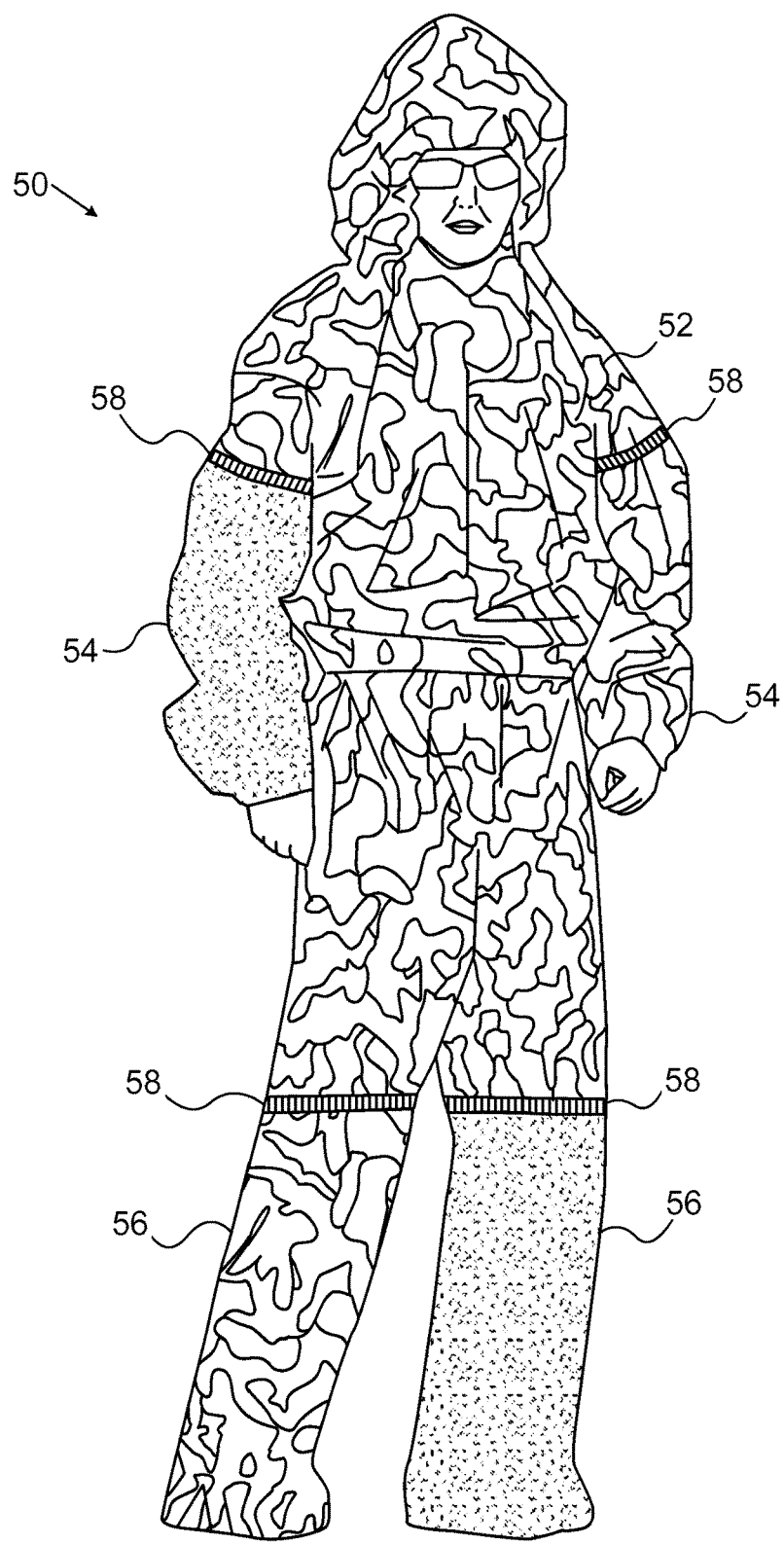
FIG. 5 is a schematic frontal view of a multispectral camouflage suit, in accordance with an alternative embodiment of the present invention.

FIG. 5 is a schematic frontal view of a multispectral camouflage suit 50, in accordance with an alternative embodiment of the present invention. Suit 50 may be made of the sorts of fabrics described above, or from other suitable types of camouflage fabric that are known in the art. As in the embodiment shown in FIGS. 1A and 1B, suit 50 is reversible, with alternative outer surfaces that are designed to provide camouflage (optical and/or thermal) in different, respective deployment environments (such as day/night or vegetated/desert).

In addition, suit 50 comprises quick-connect fasteners 58 between a torso 52 and arms 54 and legs 56 of the garment. (The arms and legs of the garment are collectively referred to as "extremity sleeves" in the present description and in the claims.) Quick-connect fasteners 58 may comprise zippers, for example, or any other suitable type of connecting element that permits the extremity sleeves to be attached to and detached from torso 52 without the need to sew or open stitches or otherwise permanently modify the fabric. Fasteners 58 permit arms 54 and legs 56 to be fastened to torso 52 either with the same fabric layer facing outward or turned inside-out relative to the torso. Thus, in the example shown in FIG. 5, the right arm and left leg of suit 50 are turned inside-out relative to the torso and to the other arm and leg.

Figure 6:
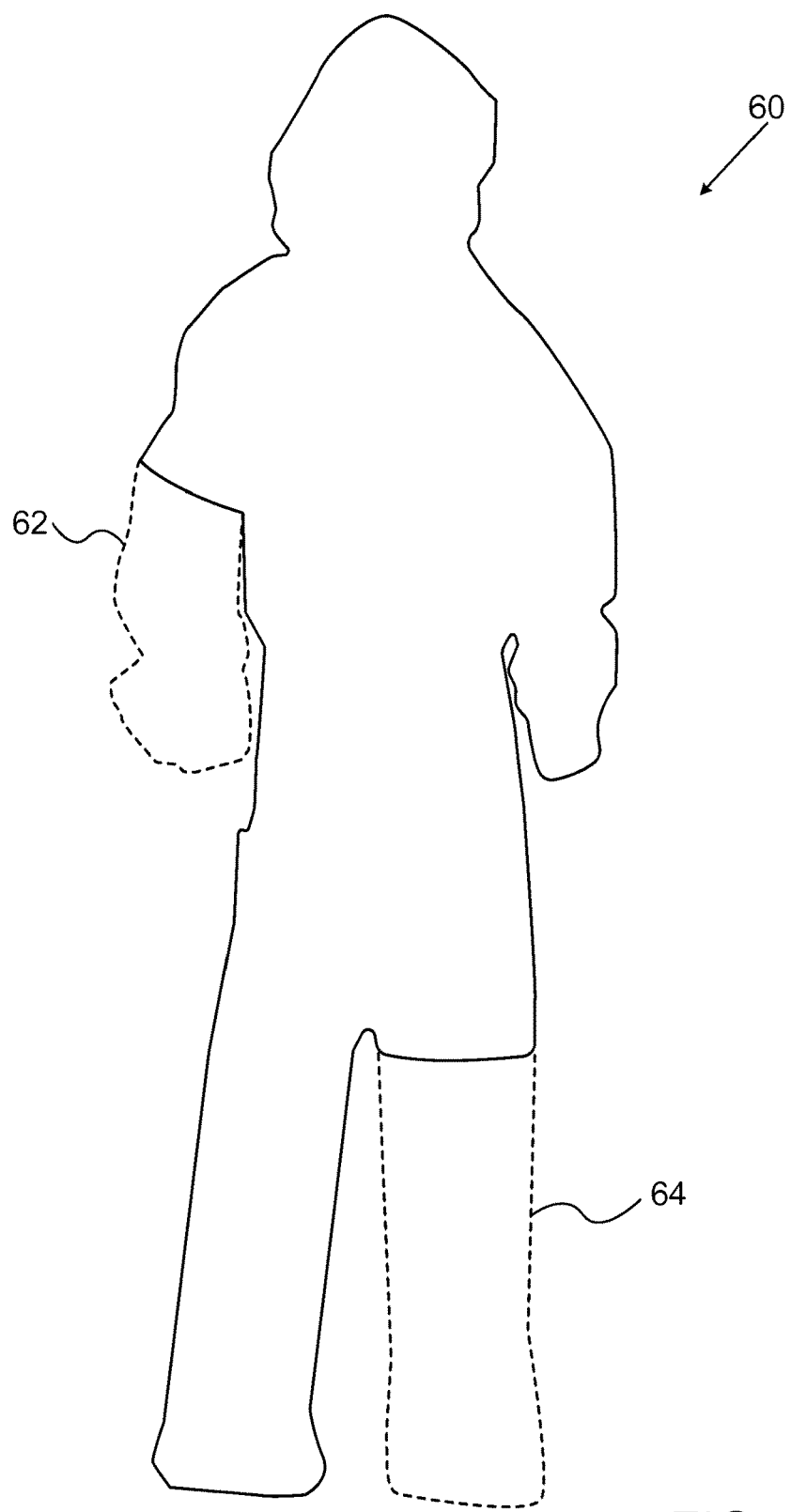
FIG. 6 is a schematic representation of a thermal image of a person wearing the camouflage suit of FIG. 5.

FIG. 6 is a schematic representation of a thermal image 60 of a person wearing camouflage suit 50. It is assumed in this example that the thermal imaging camera is tuned so as to be able to detect the thermal signature of the person's torso, notwithstanding the camouflage provided by suit 50. The right arm and left leg, however, have a different thermal signature, due to the reversal of the camouflage fabric of these extremity sleeves. As a result, the right arm and left leg appear only as faint image elements 62, 64 and may be nearly invisible in the thermal image. Consequently, an automated image processor that is programmed to recognize human forms may fail to identify image 60 as such a form, and even a human observer will have difficulty in distinguishing this image as a person.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A camouflage garment, comprising:
   a fabric configured to be worn over a body of a human subject comprising:

an outer layer having a patterned pigmentation designed to mimic ambient properties of a deployed environment of the human subject;
a metallized component forming a reflective layer designed to partially block subject thermal infrared radiation by partial scattering and partial specular reflecting of a subject thermal infrared radiation; and
a blurring component designed to scatter and reflect background thermal radiation, wherein the blurring component includes glass microballoons configured to scatter radiation, and wherein the glass microballoons of the blurring component are laminated to the reflective layer of the metallized component so as to form an internal structure,
wherein the fabric has a plurality of perforations configured to provide ventilation when worn over the body of the human subject, each of the plurality of perforations extending through the patterned pigmentation, the metallized component, and the blurring component.

2. The garment according to claim 1, wherein the fabric is cut and sewn so as to provide a first configuration that camouflages the human subject in a first deployment environment and, when the garment is turned inside-out, a second configuration that camouflages the human subject in a second deployment environment, different from the first deployment environment.

3. The garment according to claim 2, wherein the first deployment environment, in which the outer layer of the fabric faces outward, is a nighttime environment, and the second deployment environment is a daytime environment.

4. The garment according to claim 2, wherein the first deployment environment is a vegetated environment, and the second deployment environment is a desert environment.

5. The garment according to claim 2, further comprising quick-connect fasteners between a torso and extremity sleeves of the garment, wherein the quick-connect fasteners are configured to permit the extremity sleeves to be fastened to the torso while one or more of the extremity sleeves are turned inside out relative to the torso.

6. A method for producing a garment, comprising:
constructing a multicomponent fabric including:
laminating a reflective metallic layer to a blurring component layer so as to form an internal structure, wherein the reflective metallic layer includes a metallic component designed to partially block thermal infrared radiation, and wherein the blurring component layer includes glass microballoons designed to scatter radiation; and
attaching the internal structure to an outer surface layer having a patterned pigmentation to mimic ambient conditions of a deployed environment;
cutting a plurality of perforations through the multicomponent fabric, each of the plurality of perforations being configured to provide ventilation when worn over a body of a human subject; and
cutting and sewing the multicomponent fabric so as to form a garment to be worn over the body of the human subject.

7. The method according to claim 6, wherein constructing the multicomponent fabric further comprises attaching an inner surface layer to a side of the internal structure opposite of the outer surface layer, wherein a first configuration of the garment is associated with the outer surface layer facing outward so as to camouflage the human subject in a first deployment environment and, when the garment is turned inside-out, a second configuration, associated with the inner surface layer facing outward camouflages the human subject in a second deployment environment, different from the first deployment environment.

8. The method according to claim 7, wherein attaching the outer surface layer to the internal structure includes printing an outer surface fabric configured to provide visual camouflage for a nighttime environment, and wherein attaching the inner surface layer to the internal structure includes printing an inner surface fabric configured to provide visual camouflage for a daytime environment.

9. The method according to claim 7, wherein attaching the outer surface layer to the internal structure includes selecting an outer surface fabric configured to provide visual camouflage for a vegetated environment, and wherein attaching the inner surface layer to the internal structure includes selecting an inner surface fabric configured to provide visual camouflage for a desert environment.

10. The method according to claim 7, wherein cutting and sewing the multicomponent fabric so as to form the garment includes forming a torso and extremity sleeves, and wherein the method further comprises attaching quick-connect fasteners between the torso and the extremity sleeves, wherein the quick-connect fasteners are configured to permit the extremity sleeves to be fastened to the torso while one or more of the extremity sleeves are turned inside out relative to the torso.

11. The garment according to claim 3, wherein the fabric further comprises an inner surface having emissivity properties in a visible radiation range that are selected so as to mimic ambient emissivity properties of the second deployment environment.

12. The garment according to claim 1, wherein the metallic component comprises a polyester weave coated with a metallic film.

13. The garment according to claim 1, wherein each of the plurality of perforations has a width in a range of 2-3 millimeters.

14. The garment according to claim 13, wherein a pattern of the plurality of perforations is non-uniform.

15. The garment according to claim 1, wherein the glass microballoons include a metallic coating.

16. The method according to claim 8, wherein attaching the outer surface layer to the internal structure includes printing an outer surface fabric having emissivity properties in a visible radiation range that mimic ambient emissivity properties of a deployment environment of the garment.

17. The method according to claim 6, wherein constructing the multicomponent fabric includes coating a weave with a metallic film or metallic fibers so as to form the metallic component.

18. The method according to claim 6, wherein cutting the plurality of perforations includes forming a non-uniform pattern of perforations extending over at least a part of the multicomponent fabric.

19. The method according to claim 18, wherein cutting the plurality of perforations includes cutting each of the plurality of the perforations so as to have a width in a range of 2-3 millimeters.

20. The method according to claim 6, wherein constructing the multicomponent fabric includes coating the glass microballoons in a metallic coating.

21. A multiple component garment comprising:
an outer layer having a patterned pigmentation designed to mimic ambient properties of a deployed environment;
a metallized component forming a reflective layer designed to partially block subject thermal infrared radiation by partial scattering and partial specular reflecting of a subject thermal infrared radiation; and a blurring component designed to scatter and reflect background thermal radiation wherein the blurring component includes glass microballoons configured to scatter radiation, the glass microballoons of the blurring component being laminated to the reflective layer of the metallized component so as to form an internal structure, wherein the multiple component garment has a plurality of perforations configured to provide ventilation, each of the plurality of perforations extending through the patterned pigmentation, the metallized component, and the blurring component.

22. The multiple component garment of claim 21, wherein the metallic component comprises a metallic film or metallic fibers.

* * * * *